(12) United States Patent
Dooley et al.

(10) Patent No.: US 8,938,973 B2
(45) Date of Patent: Jan. 27, 2015

(54) AIR CONTAMINATION DETECTION IN AN AIRCRAFT AIR SYSTEM

(75) Inventors: Kevin Allan Dooley, Mississauga (CA); Kiritkumar Patel, Oakville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 1265 days.

(21) Appl. No.: 12/703,823

(22) Filed: Feb. 11, 2010

(65) Prior Publication Data

US 2011/0192170 A1 Aug. 11, 2011

(51) Int. Cl.
*G01N 21/78* (2006.01)
*F02C 6/08* (2006.01)
*B64D 13/02* (2006.01)

(52) U.S. Cl.
CPC .. *F02C 6/08* (2013.01); *B64D 13/02* (2013.01)
USPC .............. 60/772; 60/785; 60/795; 60/39.091; 73/23.2; 73/31.02; 422/83; 422/86; 422/94; 422/400; 422/408; 422/416; 454/71

(58) Field of Classification Search
USPC ................... 60/248, 262, 782, 785, 795, 779, 60/39.091, 39.094, 772; 73/23.2, 31.01, 73/31.02, 31.03, 31.07, 40, 49.7; 116/206; 422/83, 86, 87, 88, 89, 90, 91, 92, 93, 422/94, 97, 119, 400, 401, 402, 408, 425, 422/430, 82.05, 82.09, 416; 436/139, 140, 436/141, 142, 164, 167; 454/71, 72, 73, 74, 454/76, 77
See application file for complete search history.

(56) References Cited

U.S. PATENT DOCUMENTS

| | | | |
|---|---|---|---|
| 2,614,650 A | 10/1952 | Chandler et al. | |
| 2,951,461 A | 9/1960 | Lockwood | |
| 3,000,345 A | 9/1961 | Gray, Jr. et al. | |
| 3,217,689 A * | 11/1965 | Knight et al. | 116/206 |
| 3,680,364 A * | 8/1972 | Carrier | 73/73 |
| 3,891,417 A * | 6/1975 | Wade | 96/117.5 |
| 4,177,048 A | 12/1979 | Rivers et al. | |
| 4,205,043 A * | 5/1980 | Esch et al. | 422/416 |
| 4,269,804 A * | 5/1981 | Kring | 422/86 |
| 4,328,181 A * | 5/1982 | Anders et al. | 422/425 |
| 4,559,066 A * | 12/1985 | Hunter et al. | 96/117.5 |
| 4,577,710 A | 3/1986 | Ruzumna | |
| 4,755,360 A * | 7/1988 | Dickey et al. | 422/122 |
| 4,789,363 A | 12/1988 | Wicklein | |
| 4,822,743 A * | 4/1989 | Wegrzyn | 436/3 |
| 4,932,254 A * | 6/1990 | Davidson et al. | 73/170.25 |
| 5,095,844 A | 3/1992 | Alexander | |
| 5,168,068 A | 12/1992 | Yanagisawa et al. | |
| 5,375,592 A | 12/1994 | Kirk et al. | |
| 5,377,496 A | 1/1995 | Otto et al. | |
| 5,505,753 A * | 4/1996 | Heysek | 96/416 |
| 5,727,498 A * | 3/1998 | Hackler et al. | 116/206 |

(Continued)

*Primary Examiner* — Phutthiwat Wongwian
*Assistant Examiner* — Michael B Mantyla
(74) *Attorney, Agent, or Firm* — Norton Rose Fulbright Canada LLP (57) ABSTRACT

An aircraft air system includes a gas turbine engine, a bleed air duct directing compressed air bled from a compressor to an inner compartment within the aircraft, and an air contamination detector located downstream of the gas turbine engine compressor. The air contamination detector includes a visual indicator which detects the presence of a fluid contaminant within the bleed air.

15 Claims, 5 Drawing Sheets

(56) References Cited

U.S. PATENT DOCUMENTS

| | | | |
|---|---|---|---|
| 5,834,626 A * | 11/1998 | De Castro et al. | 73/23.3 |
| 6,187,596 B1 * | 2/2001 | Dallas et al. | 436/169 |
| 6,634,597 B2 * | 10/2003 | Johnson et al. | 244/118.5 |
| 6,722,185 B2 * | 4/2004 | Lawson et al. | 73/40 |
| 6,957,569 B1 * | 10/2005 | Napier et al. | 73/112.01 |
| 7,089,747 B2 * | 8/2006 | Fox et al. | 60/782 |
| 2004/0079137 A1 * | 4/2004 | Radolovich | 73/31.01 |
| 2007/0241033 A1 * | 10/2007 | Stephenson | 208/299 |

* cited by examiner

Fig. 5

AIR CONTAMINATION DETECTION IN AN AIRCRAFT AIR SYSTEM

TECHNICAL FIELD

The application relates generally to gas turbine engines and aircrafts having one or more gas turbine engines, and more particularly to air contamination detection in an air system of an aircraft having gas turbine engines.

BACKGROUND

Pressurized aircraft cabin air comes from air bled off from the gas turbine engines of the aircraft. However, the engine bleed air can sometimes become slightly contaminated with oil or other fluids, which may result in an objectionable oil or smoke smell in the cabin of the aircraft. Existing systems used to detect such air contamination typically require specialized and complex instrumentation. Further, when this occurs in multi-engine aircraft, it can be difficult to determine which of the engines is the source of the oil contamination of the bleed air in an efficient manner.

An improved bleed air contamination detection system is thus sought.

SUMMARY

There is provided an air system in an aircraft, the air system comprising: one or more gas turbine engines fixed to the aircraft; one or more bleed air ducts directing compressed air bled from compressors in each of said gas turbine engines to an inner compartment within the aircraft; and an air contamination detector located downstream of the compressors of each of the gas turbine engines, the air contamination detector having a detecting surface exposed to the bleed air within the bleed air ducts, the detecting surface including a visual indicator which detects the presence of a fluid contaminant within the bleed air, the air contamination detector being removable from the air system during on-wing maintenance of the gas turbine engines to permit visual inspection of the visual indicator and therefore detection of the presence of a fluid contaminant in the bleed air.

There is also provided a method of isolating a source of one or more contaminants in an air system of a aircraft having two or more gas turbine engines, the method comprising: providing an air contaminant detector within a flow of bleed air downstream of each of said gas turbine engines from which said bleed air is generated, said air contaminant detectors having a visual indicator operable to visually indicate the presence of a predetermined fluid contaminant present in the bleed air; visually inspecting said visual indicators on each of said air contaminant detectors; and identifying which of said gas turbine engines is the source of the contaminant detected in the air system based on which of said air contaminant detectors has the visual indicator that indicates the presence of the contaminant.

There is further provided a gas turbine engine air system comprising a gas turbine engine having a compressor and a bleed air duct in fluid flow communication with the compressor, the bleed air duct directing air bled from the compressor external to the gas turbine engine for use within an aircraft, and a contamination detector mounted within the bleed air duct downstream of the compressor such that a detector surface of the contamination detector is exposed to the bleed air within the bleed air duct, the detector surface including a visual indicator which senses and indicates the presence of one or more fluid contaminants within the bleed air, the contamination detector being removable from the gas turbine engine to permit visual inspection of the visual indicator.

Further details will be apparent from the detailed description and figures included below.

DESCRIPTION OF THE DRAWINGS

Reference is now made to the accompanying figures, in which.

DETAILED DESCRIPTION

Figure 1:
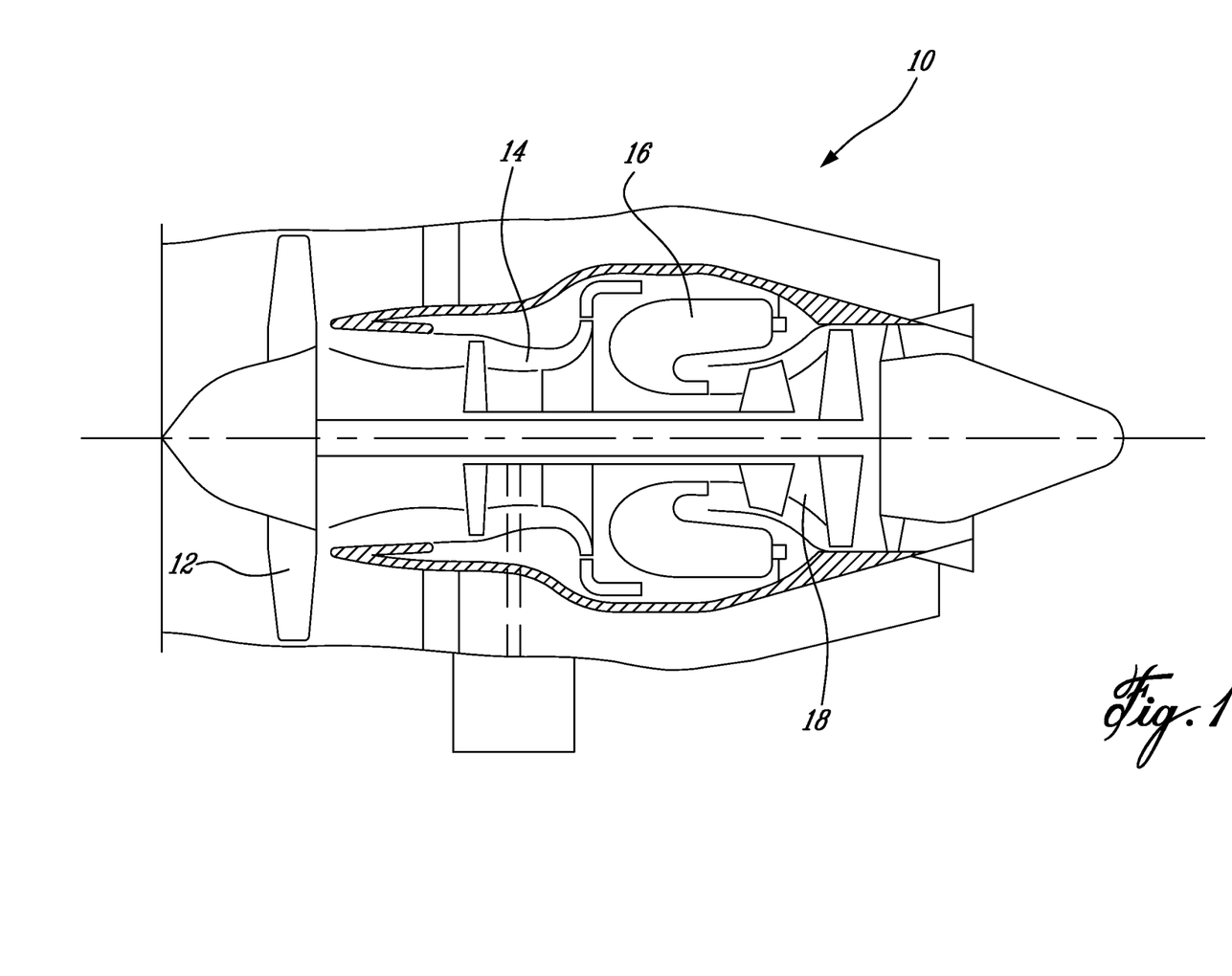
FIG. 1 is a schematic cross-sectional view of a gas turbine engine.

FIG. 1 illustrates a gas turbine engine 10 of a type preferably provided for use in subsonic flight, generally comprising in serial flow communication a fan assembly 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. Turbine section 18 includes at least one turbine disc having a plurality of turbine blades mounted thereto.

Figure 2:
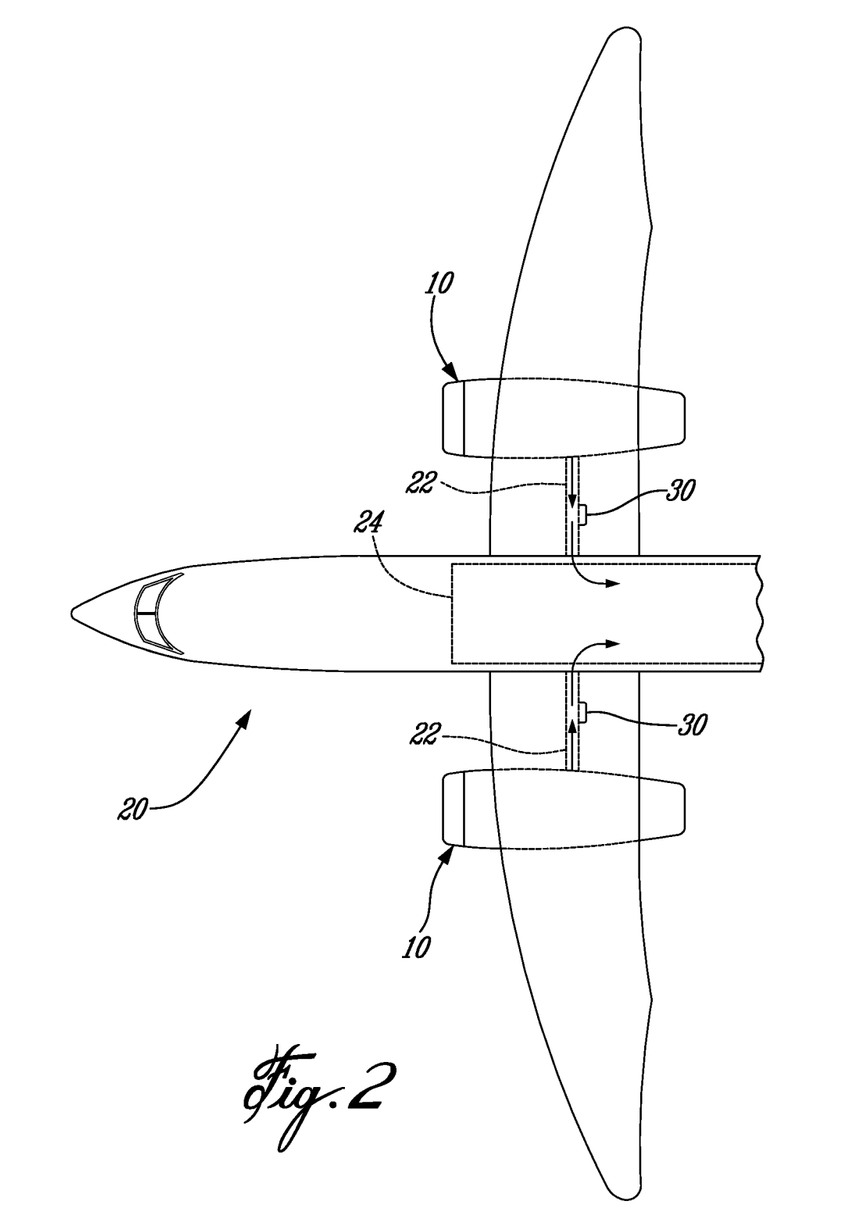
FIG. 2 is a schematic partial top plan view of an aircraft having several gas turbine engines as shown in FIG. 1.

In use within an aircraft, such as the aircraft 20 depicted in FIG. 2 for example, air is bled from the compressor section of gas turbine engines for a number of reasons, including to provide pressurized aircraft cabin air. Accordingly, air bled off from the compressor 14 of the gas turbine engine 10 is directed to the aircraft cabin 24 via bleed air ducts 22, such as to provide pressurized air to the occupants of the aircraft cabin. However, as noted above, engine bleed air has been known to sometimes become slightly contaminated with oil and/or other fluids from the engine, which can result in an objectionable oil or smoke smell in the cabin of the aircraft.

As such, the present system and method provides a simple yet effective means for determining the presence of a contaminant (such as oil or fuel, for example) in the airflow of the secondary air system of a gas turbine engine (i.e. the air system used to provide pressurized air for external uses, such as cabin air for example, and not air used within the engine itself for cooling or other purposes), whether directly in the gas turbine engine itself or downstream within bleed air ducting for example. As will be seen, the present system uses a detection element within the bleed air conduit which permits the simple inspection thereof such as to visually determine if a contaminant vapour has been present inside the bleed air conduit in question. In the case of a multi-engine aircraft 20, several detection elements 30 of the present system are employed such as allow the rapid identification of which engine 10 is responsible for identified cabin air contamination, greatly simplifying the task of tracing and/or fixing the problem.

FIG. 2 shows an aircraft 20 having gas turbine engines 10. Although two engines are depicted, it is to be understood that the aircraft 20 may have one or more engines. However, as noted above, one particular use of the present air contamination detection system is for detecting which of a number of possible gas turbine engines are responsible for causing contaminants detected in the air system used to provide cabin air to the aircraft. As such, one possible use of the present system is for multi-engine aircraft (i.e. an aircraft having two or more gas turbine engines).

As seen in FIG. 2, air bled from the gas turbine engines 10 is directed through bleed air ducts 22 to the cabin 24 of the aircraft 20. The present air contaminant detection system includes a detection element 30 which is disposed within the secondary air system of the gas turbine engine itself and/or the air system of the aircraft. In one particular embodiment, shown in FIG. 2, a detection element 30 is located within each bleed air duct 22 interconnecting each engine 10 (i.e. the air source) with the aircraft compartment to be provided with air (such as, but not necessarily, the aircraft cabin 24). As will be described further below, the detection element 30 may be a cover, bolt or plug which is exposed to the bleed air within the bleed air ducts 22, yet which remains readily accessible for visual inspection (for example by removal or in situ). Although the detection element 30 will be generally described herein as being located within the bleed air ducts 22 which direct the compressor bleed air from the gas turbine engine 10 to the aircraft cabin 24, it is to be understood that the detection element 30 can be located elsewhere within the air system of the aircraft and/or the engine, including directly within the engine 10 itself.

Figure 3:
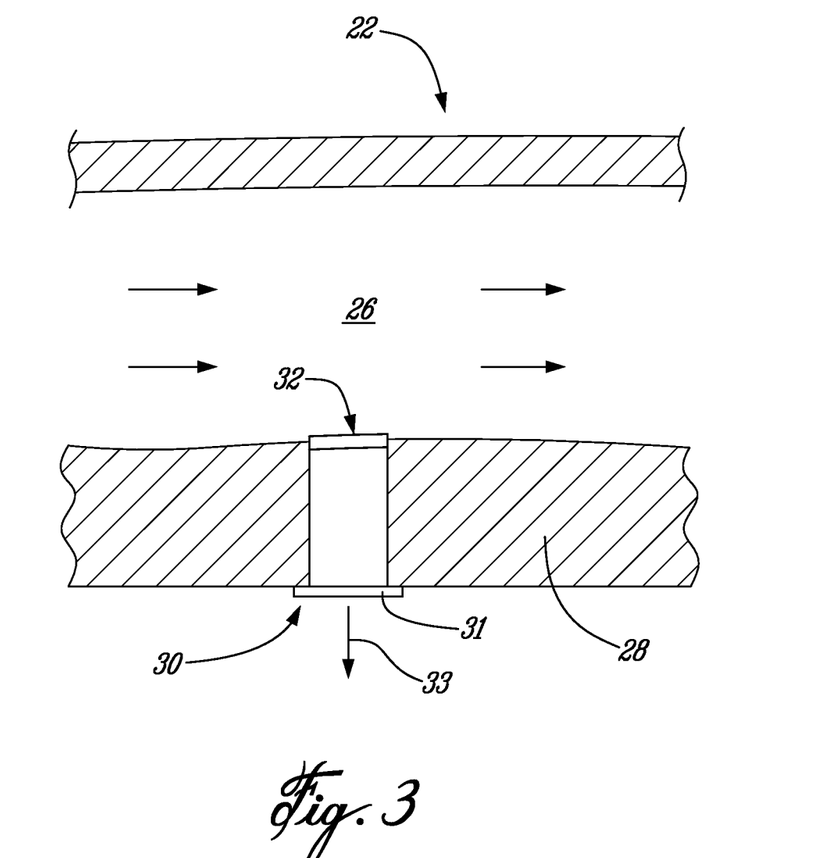
FIG. 3 is a schematic cross-sectional view of an air duct which directs air bled from the gas turbine engine to the aircraft cabin, the air duct having therein a contamination detection element of an air contamination detection system.

Referring to FIG. 3, the bleed air duct or conduit 22 defines an airflow passage 26 therethrough and thus acts as a conduit in fluid flow communication with both the bleed air outlet of the engine 10 and the downstream destination of the bleed air (such as the aircraft cabin 24 for example). A detection element 30 is disposed within one side wall 28 of the bleed air conduit 22, such that at least a portion thereof is exposed to the air within the passage 26. This portion of the detection element 30 that is exposed to the airflow includes a detection surface 32 with which the air flowing through the passage 26 of the bleed air conduit 22 comes into contact.

The detection element 30 may be a bolt that is threadably engaged within the conduit wall 28, or a plug that is retained in place by a suitable engagement and/or locking mechanism. The detection surface 32 is disposed on an internal end of the generally cylindrically shaped bolt or plug which is exposed to the air flowing through the conduit passage 26. This internal end of the bolt or plug may be flat as shown in FIG. 3, or may have other shapes. In at least one embodiment, the detection surface 32 is substantially flush with the internal surface of the conduit wall 28 within which the detection element 30 is disposed, however the detection surface 32 may also protrude slightly into the airflow path. Given that the detection surface 32 of the detection element 30 is substantially flush with the internal surface of the conduit wall 28, the detection element 30 does not extend across the air flow path 26 through the bleed air duct 22, as clearly seen in FIG. 3. This is similarly true of the embodiment of FIG. 4, as will be described in further detail below. In the detection element 30 of FIG. 3, the outer end 31 of the detection bolt or plug 30 includes a head portion or another suitable configuration which permits the detection element 30 to be removed from engagement with the conduit wall 28, such that the detection surface 30 thereof can be at least visually inspected. Regardless of the configuration or shape of the outer end 31 of the detection element 30, it is removably engaged within the wall 28 of the conduit 22 such that it can be removed by being displaced in the direction 33 (whether by sliding, rotating, etc.).

Figure 4:
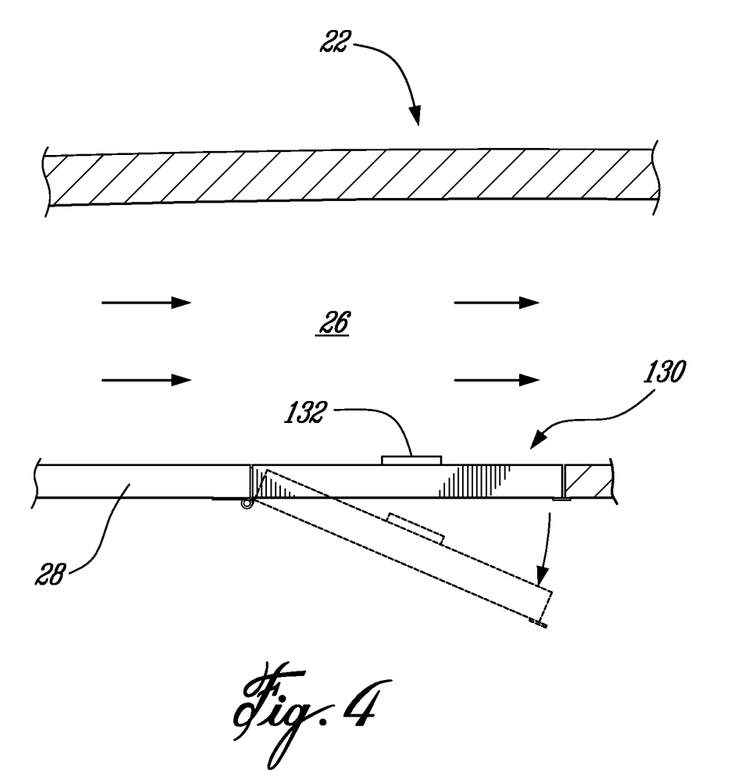
FIG. 4 is a schematic cross-sectional view of another bleed air duct having an alternate contamination detection element.

In the alternate embodiment depicted in FIG. 4, an alternate detection element comprises a cover or flap 130 which has a detection surface 132 on an internal side thereof to which the bleed air within the airflow passage 26 of the conduit 22 is exposed. The cover 130 may be, for example, a pivoting inspection cover which remains closed during operation of the engine but which can be opened (as shown in broken lines in FIG. 4) for inspection, repair and/or overhaul purposes. As noted above, the detection surface 132 on the internal side of the cover 130 may either protrude slightly into the airflow passage 26 or may be embedded within the cover 130. Given the larger surface area of the cover 130, the detection surface 132 may be any number of shapes and sizes.

Figure 5:
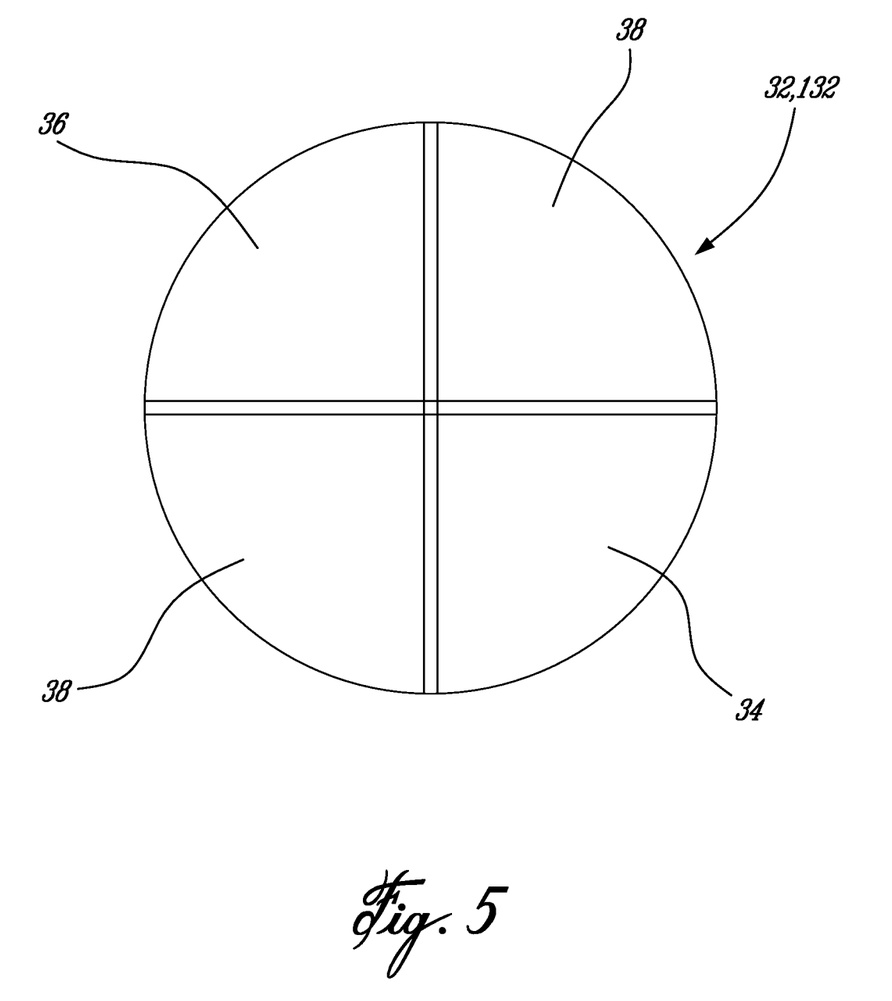
FIG. 5 is a schematic end view of the detection element of FIG. 3.

Referring now to FIG. 5 which shows the detection surface 32,132 in further detail, the detection surface is able to detect contaminants within the air and provides a visual indication, upon detection of one or more contaminants, of the presence of such contaminants. These contaminants which can be detected in the air passage include, but are not limited to, oil and fuel.

More specifically, the detection surface 32,132 of the present detection element may in one embodiment include a specially treated indicator designed to change color when exposed to a predetermined contaminant. In fact, a number of different contaminants can in fact be detected using a single detection surface 32 which includes separate regions thereon, each region being configured to detect a different contaminant. As seen in FIG. 5, the detection surface 32,132 is divided into four distinct regions (which in this case are four equally sized quadrants) that include, for example, a first portion 34 which is sensitive to oil vapour, a second portion 36 which is sensitive to fuel vapour, and two portions 38 which serve as reference regions. The reference regions 38 provide a baseline or control for the two contaminant indicator regions 34 and 36, whereby if either of the oil sensitive portion 34 or the fuel sensitive portion 36 indicate that the presence of these particular contaminants have been detected, by changing colour for example, this changed colour within the regions 34 or 36 can be visually compared to the reference regions 38, the reference regions 38 having a colour which exactly matches that of the detector regions prior to being exposed to any contaminants.

The detection regions 34,36 may be provided by applying an appropriate chemical indicator to this particularly region of the detection surface 32,132, the chemical indicator being designed to change color when exposed to a specific, predetermined, contaminant.

While in the embodiment depicted of the detection surface 32,132, two such detection regions are provided so as to be able to detect the presence of two different contaminants in the bleed air flow, it is to be understood that one or more such detection regions may be provided so as to be able to detect anywhere from a single contaminant to a plurality of contaminants.

In operation, the contaminant detection element of the present gas turbine engine air system contaminant detection system works as follows. If oil or fuel vapour (or another contaminant) enters the bleed air system from one of the gas turbine engines, the tip of the installed sensing bolt 30 having the detection surface 32 thereon is exposed to both the bleed air and the entrained contaminants within the passage 26 within which the detection/sensing bolt 30 is installed. The presence of the contaminant in the airflow causes the corresponding sensitive area of the bolt (such as the oil sensitive region 34 in the case of oil vapour for example) to absorb some of the contaminant. The chemical composition of the sensing materials deposited within this region 34 of the detection surface 32 on the bolt tip are formulated such that a change in the color or hue of the material occurs when exposed to this particular contaminant (oil, in this case).

Accordingly, should a complaint be received about cabin air smell, at the next opportune time a routine, on-wing, inspection may be performed by removing the detection bolt 30 in question from the engine or the bleed duct and visually inspected to identify what particular contaminant is present within the bleed air and which engine is the offending engine, i.e. the source of this contaminant. Given that a separate detection element 30 is mounted in or downstream from each of the engines 10 of the aircraft, the offending engine can be quite easily and efficiently identified. The advantage to this approach is that it is a cost effective method of identifying which engine in a multi-engine aircraft is the source of a contaminant leak, without the need for special instrumentation installed on each engine or any significant repair or overhaul procedures.

The contaminant detection material can alternately be deposited on the inside of a tube, either within the gas turbine engine or external to the engine but within the air system of the aircraft, which tube is readily accessible for visual inspection (with or without removal thereof). In another alternate embodiment, the contaminant detection material can be provided on a probe element which can be installed, when necessary, within the engine or within the aircraft air system, in order to detect the presence of a contaminant such as oil or fuel within the air system. Locating the probe at different locations, such as proximate different engines in successive tests, can then be performed in order to determine which of the engines is causing the oil or fuel contamination detected in the bleed air.

The above description is meant to be exemplary only, and one skilled in the art will recognize that changes may be made to the embodiments described without departing from the scope of the claims. For example, although the detection element has been described as being installed within a bleed air duct 22, which directs the bleed air from the engine to the aircraft compartment, the detection elements of the present contaminant detection system can be provided within a much smaller tube, duct or passage, whether within the gas turbine engine itself or elsewhere in the air system of the aircraft. Such a detection element may, for example, be disposed direction at the air inlet to the aircraft cabin, and thus may be integrated directly into a grill or vent through which the air enters the cabin. Additionally, although the contaminant sensitive regions of the detection surface on the detection element have been described as changing color when the selected contaminant is detected as being present in the bleed air, other means for visually indicating the presence of the contaminant are possible, such as a change in surface finish, or any other variation in appearance that is visible by eye. This can include, however, a visual change that requires an ultraviolet light or black light, for example, to be able to notice the colour change (i.e. an is therefore not necessarily visible to the un-aided or naked eye). Still other modifications which fall within the scope of the present application will be apparent to those skilled in the art, in light of a review of this disclosure, and such modifications are intended to fall within the appended claims.

The invention claimed is:

1. An air system in an aircraft, the air system comprising: one or more gas turbine engines fixed to the aircraft; one or more bleed air ducts directing compressed air bled from compressors in each of said gas turbine engines to an inner compartment within the aircraft; and an air contamination detector located downstream of the compressors of each of the gas turbine engines, the air contamination detector having a detecting surface exposed to the bleed air within the bleed air duct, the detecting surface including a visual indicator which detects the presence of a fluid contaminant within the bleed air and indicates same, the air contamination detector being removably mounted within a wall of the bleed air duct with the detecting surface substantially flush with an inner surface of the wall of the bleed air duct that faces the bleed air flowing through the bleed air duct, wherein the air contamination detector does not extend into the bleed air the air contamination detector being thereby removable from the air system for visual inspection of the visual indicator, the visual indicator of the detecting surface including a product which chemically reacts with the fluid contaminant in order to visually indicate when the fluid contaminant is present in the the bleed air, wherein the air contamination detector is a threaded bolt or plug engaged within the bleed air duct such that a tip of the threaded bolt or plug is exposed to the bleed air, the tip having the detecting surface thereon.

2. The air system as defined in claim 1, wherein the fluid contaminant is at least one of oil and fuel.

3. The air system of claim 1, wherein the product of the visual indicator changes color in the presence of said fluid contaminant.

4. The air system as defined in claim 1, wherein the detecting surface includes two or more regions, at least a first one of said two or more regions having said product therein to provide the visual indicator, and at least a second one of said two or more regions providing a control against which the visual indicator is compared upon visual inspection.

5. The air system as defined in claim 4, wherein the product of the visual indicator changes color in the presence of said fluid contaminant, and the second one of said regions is substantially free of said product and has a color which is substantially the same as that of the first one of said regions when the product therein is un-reacted with the fluid contaminant.

6. The air system as defined in claim 1, wherein the detecting surface has two visual indicator regions and two control regions, a first region of said two visual indicator regions changing a first color when oil is detected as being present in the bleed air, a second region of said two visual indicator regions changing a second color when fuel is detected as being present in the bleed air, and said two control regions respectively having a color substantially the same as that of the first and second regions of said two visual indicator regions prior to detection of any fluid contaminants in the bleed air.

7. A method of isolating a source of one or more contaminants in an air system of an aircraft having two or more gas turbine engines, the method comprising: providing an air contaminant detector within a flow of bleed air downstream of each of said gas turbine engines from which said bleed air is generated, including removably mounting said air contaminant detector within a wall of a bleed air duct with the detecting surface substantially flush with an inner surface of the wall of the bleed air duct that faces the flow of bleed air flowing through the bleed air duct, wherein the air contaminant detector does not extend into the flow of bleed air said air contaminant detectors having a visual indicator operable to visually indicate the presence of a predetermined fluid contaminant present in the bleed air by chemically reacting with the fluid contaminant in order to visually indicate when the fluid contaminant is present in the bleed air; visually inspecting said visual indicators on each of said air contaminant detectors; and identifying which of said gas turbine engines is the source of the contaminant detected in the air system based on which of said air contaminant detectors has the visual indicator that indicates the presence of the contaminant, wherein the air contaminant detector is a threaded bolt or plug engaged within the bleed air duct such that a tip of the threaded bolt or plug is exposed to the flow of bleed air, the tip having the detecting surface thereon.

8. The method of claim 7, wherein the step of visually inspecting further comprises removing the air contaminant detectors from the air system for visual inspection.

9. The method of claim 8, further comprising performing the visual inspection during on-wing maintenance wherein the gas turbine engines remain in situ within the aircraft.

10. The method of claim 7, wherein the air contaminant detectors include a detection surface having at least a first region providing said visual indicator and at least a second region free of said visual indicator, the second region providing a control against which the visual indicator can be compared, and wherein the step of visually inspecting further comprises comparing a color of the visual indicator within said first region against a color of the control within said second region.

11. The method of claim 7, wherein each of said air contaminant detectors includes two visual indicators operable to detect the presence of two different contaminants in the bleed air, further comprising the step of determining whether one or both of said two different contaminants are present in the bleed air.

12. A gas turbine engine air system comprising a gas turbine engine having a compressor and a bleed air duct in fluid flow communication with the compressor, the bleed air duct directing bleed air bled from the compressor external to the gas turbine engine for use within an aircraft, and a contamination detector mounted within a wall of the bleed air duct downstream of the compressor with a detector surface of the contamination detector substantially flush with an inner surface of the wall of the bleed air duct that faces the bleed air flowing through the bleed air duct such that the detector surface of the contamination detector is exposed to the bleed air within the bleed air duct while the contamination detector does not extend into the bleed air the detector surface including a visual indicator which senses and indicates the presence of one or more fluid contaminants within the bleed air, the contamination detector being removable from the gas turbine engine to permit visual inspection of the visual indicator, and the visual indicator of the detecting surface including a product which chemically reacts with the fluid contaminant in order to visually indicate when the fluid contaminant is present in the bleed air, wherein the contamination detector is a threaded bolt or plug engaged within the bleed air duct such that a tip of the threaded bolt or plug is exposed to the bleed air, the tip having the detector surface thereon.

13. The gas turbine engine air system of claim 12, wherein the product of the visual indicator changes color in the presence of said fluid contaminant.

14. The gas turbine engine air system as defined in claim 12, wherein the detecting surface includes two or more regions, at least a first one of said two or more regions having said product therein to provide the visual indicator, and at least a second one of said two or more regions being substantially free of said product and providing a control against which the visual indicator is compared upon visual inspection.

15. The gas turbine engine air system as defined in claim 14, wherein the product of the visual indicator changes color in the presence of said fluid contaminant, and the second one of said regions has a color which is substantially the same as that of the first one of said regions when prior to the product therein reacting with the fluid contaminant.

* * * * *